(12) United States Patent
Celermajer et al.

(10) Patent No.: US 12,490,988 B2
(45) Date of Patent: Dec. 9, 2025

(54) DEVICE AND METHOD FOR ALTERING BLOOD FLOW CHARACTERISTICS IN A VESSEL

(71) Applicant: The Brain Protection Company PTY LTD, Paddington (AU)

(72) Inventors: David Stephen Celermajer, Vaucluse (AU); Anthony Ujhazy, East Lindfield (AU); Zoran Milijasevic, Bayview (AU)

(73) Assignee: The Brain Protection Company PTY LTD, Paddington (AU)

( * ) Notice: Subject to any disclaimer, the term of this patent is extended or adjusted under 35 U.S.C. 154(b) by 472 days.

(21) Appl. No.: 17/785,356

(22) PCT Filed: Dec. 16, 2020

(86) PCT No.: PCT/AU2020/051377
§ 371 (c)(1),
(2) Date: Jun. 14, 2022

(87) PCT Pub. No.: WO2021/119737
PCT Pub. Date: Jun. 24, 2021

(65) Prior Publication Data
US 2024/0108348 A1    Apr. 4, 2024

(30) Foreign Application Priority Data
Dec. 16, 2019    (AU) .................. 2019904753

(51) Int. Cl.
*A61B 17/12* (2006.01)
*A61B 17/00* (2006.01)
*A61B 90/00* (2016.01)

(52) U.S. Cl.
CPC .............. *A61B 17/12* (2013.01); *A61B 90/06* (2016.02); *A61B 2017/00778* (2013.01);
(Continued)

(58) Field of Classification Search
CPC .......... A61B 17/12; A61B 2017/00778; A61B 2017/00862; A61B 2017/00867; A61B 2090/064; A61B 2560/0468
See application file for complete search history.

(56) References Cited

U.S. PATENT DOCUMENTS 3,657,744 A    4/1972    Ersek
3,726,279 A    4/1973    Barefoot
(Continued)

FOREIGN PATENT DOCUMENTS

DE    102004018255    11/2005
EP    2586402    5/2013
(Continued)

OTHER PUBLICATIONS

Cifuentes et al., "Hypertension Accelerates the Progression of Alzheimer-Like Pathology in a Mouse Model of the Disease," hyper.ahajournals, Jun. 2015, 7 pgs.
(Continued)

*Primary Examiner* — Katherine Shi
*Assistant Examiner* — Mohammed S Adam
(74) *Attorney, Agent, or Firm* — Perkins Coie LLP (57) ABSTRACT

A device (15, 50, 55, 60, 100, 200) for altering blood flow characteristics in a vessel (20), the device (15, 50, 55, 60, 100, 200) comprising: a cuff (10) configured to be surgically positioned around a portion of the vessel (20); a first pad (40) located on an internal wall of the cuff (10), wherein the pad (40): locally reduces a cross-sectional area of a passageway (25) extending through the cuff (10) and/or defines a passageway (25) within the cuff (10) which is non-linear.

13 Claims, 8 Drawing Sheets

(52) U.S. Cl.
CPC .............. *A61B 2017/00862* (2013.01); *A61B 2017/00867* (2013.01); *A61B 2090/064* (2016.02); *A61B 2560/02* (2013.01); *A61B 2560/0468* (2013.01); *A61B 2562/0247* (2013.01)

(56) References Cited

U.S. PATENT DOCUMENTS

| | | | |
|---|---|---|---|
| 4,881,939 A | 11/1989 | Newman | |
| 5,002,531 A | 3/1991 | Bonzel | |
| 5,100,429 A | 3/1992 | Sinofsky et al. | |
| 5,222,980 A | 6/1993 | Gealow | |
| 5,618,301 A | 4/1997 | Hauenstein | |
| 5,634,895 A | 6/1997 | Igo | |
| 5,665,117 A | 9/1997 | Rhodes | |
| 5,702,419 A | 12/1997 | Berry | |
| 5,755,777 A | 5/1998 | Chuter | |
| 5,800,524 A | 9/1998 | Borghi | |
| 5,800,526 A | 9/1998 | Anderson et al. | |
| 5,919,224 A | 7/1999 | Thompson et al. | |
| 6,010,529 A | 1/2000 | Herweck | |
| 6,030,336 A | 2/2000 | Franchi | |
| 6,042,605 A | 3/2000 | Martin et al. | |
| 6,120,534 A | 9/2000 | Ruiz | |
| 6,129,756 A | 10/2000 | Kugler et al. | |
| 6,241,691 B1 | 6/2001 | Ferrera et al. | |
| 6,350,282 B1 | 2/2002 | Eberhardt | |
| 6,395,019 B2 | 5/2002 | Chobotov | |
| 6,974,473 B2 | 12/2005 | Barclay et al. | |
| 6,984,201 B2 | 1/2006 | Khaghani | |
| 7,125,464 B2 | 10/2006 | Chobotov et al. | |
| 7,147,661 B2 | 12/2006 | Chobotov | |
| 7,575,594 B2 | 8/2009 | Sieracki | |
| 7,766,814 B2 | 8/2010 | Walsh | |
| 7,819,941 B2 | 10/2010 | Kunze | |
| 8,702,776 B2 | 4/2014 | Heltai | |
| 8,708,906 B1 | 4/2014 | Orehek | |
| 8,876,850 B1 | 11/2014 | Vollmers | |
| 9,017,359 B2 | 4/2015 | Scandurra | |
| 9,039,725 B1 | 5/2015 | Vollmers | |
| 9,125,567 B2 | 9/2015 | Gross et al. | |
| 9,242,082 B2 | 1/2016 | Vollmers | |
| 9,492,293 B2 | 11/2016 | Richter et al. | |
| 9,592,068 B2 | 3/2017 | Janardhan et al. | |
| 10,064,626 B2 | 9/2018 | Celermajer et al. | |
| 11,224,433 B2 | 1/2022 | Celermajer et al. | |
| 2001/0027338 A1 | 10/2001 | Greenberg | |
| 2002/0188341 A1 | 12/2002 | Elliott | |
| 2003/0065303 A1 | 4/2003 | Wellman | |
| 2003/0125797 A1 | 7/2003 | Chobotov et al. | |
| 2004/0010303 A1 | 1/2004 | Bolea | |
| 2004/0106971 A1 | 6/2004 | Schwartz | |
| 2004/0143319 A1 | 7/2004 | Schwartz et al. | |
| 2004/0147803 A1 | 7/2004 | Hegde | |
| 2004/0260384 A1 | 12/2004 | Allen | |
| 2005/0021023 A1 | 1/2005 | Guglielmi et al. | |
| 2005/0049677 A1 | 3/2005 | Farnan | |
| 2005/0055082 A1 | 3/2005 | Muvhar | |
| 2006/0025852 A1 | 2/2006 | Armstrong et al. | |
| 2006/0052866 A1 | 3/2006 | Gilles et al. | |
| 2006/0100530 A1 | 5/2006 | Kliot et al. | |
| 2006/0106449 A1 | 5/2006 | Ben Muvhar | |
| 2007/0156167 A1 | 7/2007 | Connors et al. | |
| 2008/0194905 A1 | 8/2008 | Walsh | |
| 2009/0177279 A1 | 7/2009 | Luciano et al. | |
| 2010/0030253 A1 | 2/2010 | Harris et al. | |
| 2010/0056978 A1 | 3/2010 | Machan et al. | |
| 2010/0256735 A1 | 10/2010 | Morales, Jr. | |
| 2011/0106240 A1 | 5/2011 | Chuter | |
| 2011/0144669 A1 | 6/2011 | Becking et al. | |
| 2011/0166240 A1 | 7/2011 | Chuter | |
| 2011/0196967 A1 | 8/2011 | Tachibana | |
| 2011/0213408 A1 | 9/2011 | Gross et al. | |
| 2011/0264116 A1* | 10/2011 | Kocur | A61B 17/12 606/139 |
| 2012/0089218 A1 | 4/2012 | Dardi | |
| 2013/0013051 A1 | 1/2013 | Benary | |
| 2013/0066416 A1 | 3/2013 | Goicoechea et al. | |
| 2013/0079871 A1 | 3/2013 | Scandurra et al. | |
| 2013/0172981 A1 | 7/2013 | Gross | |
| 2013/0218191 A1 | 8/2013 | Heltai | |
| 2013/0226280 A1 | 8/2013 | O'Rourke | |
| 2013/0296917 A1 | 11/2013 | Rees | |
| 2014/0058436 A1 | 2/2014 | Rosenbluth et al. | |
| 2014/0350658 A1 | 11/2014 | Benary | |
| 2015/0025625 A1 | 1/2015 | Rylski et al. | |
| 2015/0088239 A1 | 3/2015 | Ben-Muvhar | |
| 2017/0042551 A1 | 2/2017 | Celermajer et al. | |
| 2017/0087045 A1 | 3/2017 | Zhadkevich | |
| 2017/0172771 A1 | 6/2017 | Bruckheimer et al. | |
| 2017/0173262 A1 | 6/2017 | Veltz | |
| 2017/0354421 A1* | 12/2017 | Maguire | A61B 17/12159 |
| 2018/0008279 A1 | 1/2018 | Celermajer et al. | |
| 2018/0214157 A1* | 8/2018 | Celermajer | A61B 17/12109 |
| 2018/0280028 A1 | 10/2018 | Orion et al. | |
| 2019/0307459 A1 | 10/2019 | Celermajer et al. | |
| 2019/0336133 A1 | 11/2019 | Celermajer et al. | |
| 2020/0375721 A1 | 12/2020 | Celermajer et al. | |
| 2021/0007839 A1 | 1/2021 | Du | |
| 2021/0393189 A1 | 12/2021 | Celermajer et al. | |
| 2022/0008229 A1 | 1/2022 | Celermajer et al. | |
| 2022/0022881 A1 | 1/2022 | Celermajer et al. | |
| 2022/0233200 A1 | 7/2022 | Celermajer et al. | |

FOREIGN PATENT DOCUMENTS

| | | |
|---|---|---|
| JP | 5782523 | 2/2014 |
| WO | WO1996032077 | 10/1996 |
| WO | WO2001056501 | 8/2001 |
| WO | WO2003028522 | 4/2003 |
| WO | WO2004062112 | 4/2004 |
| WO | WO2004056274 | 7/2004 |
| WO | WO2005041783 | 5/2005 |
| WO | WO2005084730 | 9/2005 |
| WO | WO2006062976 | 6/2006 |
| WO | WO2007038476 | 4/2007 |
| WO | WO2008061185 | 5/2008 |
| WO | WO2012018590 | 2/2012 |
| WO | WO2012071395 | 5/2012 |
| WO | WO2013013081 | 1/2013 |
| WO | WO2013084235 | 6/2013 |
| WO | WO2014186755 | 11/2014 |
| WO | WO2004106971 | 12/2014 |
| WO | WO2016128983 | 8/2016 |
| WO | WO2017024357 | 2/2017 |
| WO | WO2018027298 | 2/2018 |
| WO | WO2018064769 | 4/2018 |
| WO | WO2018146184 | 8/2018 |
| WO | WO2020073094 | 4/2020 |
| WO | WO2020117560 | 6/2020 |
| WO | WO2020117562 | 6/2020 |
| WO | WO2021119737 | 6/2021 |

OTHER PUBLICATIONS

Cullen, et al. "Microvascular pathology in the aging human brain: Evidence that senile plaques are sites of microhaemorrhages." Neurobiology of Aging (2006) 27, Jan. 2006, pp. 1786-1796.

Ding et al., "Carotid Arterial Stiffness and Risk of Incident Cerebral Microbleeds in Older People," Arterioscler Thromb Vasc Biol, Jun. 11, 2015, 7 pgs.

Messas et al. "Arterial wall elasticity: State of the art and future prospects," Diagnostic and Interventional Imaging, (2013) 94, http://dx.doi.org/10.1016/j.diii., Jan. 2013, pp. 561-569.

Mitchell et al. "Arterial Stiffness, pressure and flow pulsatility and brain structure and function: the Age, Gene/Environment Susceptibility—Reykjavik Study," Brain (2011) 134; received Aug. 2011, 3398-3407.

Stone et al. "The Mechanical Cause of Age-Related Dementia (Alzheimer's Disease): The Brain is Destroyed by the Pulse," Journal of Alzheimer's Disease (2015) 44; accepted Sep. 2014, pp. 355-373.

(56) References Cited

OTHER PUBLICATIONS

International Preliminary Report on Patentability issued for International Application No. PCT/AU2016/050734, Applicant: The Brain Protection Company Pty Ltd, Date of Mailing: Jan. 2, 2018, 55 pages.
Takaiwa A. et al., "Changes in cognitive function during the 1-year period following endarterectomy and stenting of patients with high-grade carotid artery stenosis," Acta Neurochir, 2009, Published online Jun. 2009, vol. 151, pp. 1593-1600.
Grunwald I. Q. et al., "Influence of carotid artery stenting on cognitive function," Neuroradiology, 2010, Published online Nov. 2009, vol. 52, pp. 61-66.
Raabe R.D. et al., "One-year Cognitive Outcomes Associated with Carotid Artery Stent Placement," J Vasc Interv Radiol, 2010, vol. 21, DOI: 10.1016/j.jvir., Mar. 2010, pp. 983-988.
Lal B. K. et al., "Cognitive changes after surgery vs stenting for carotid artery stenosis," J Vasc Surg, 2011, Mar. 2011, vol. 54, pp. 691-698.
Chen Y-H et al., "Carotid stenting improves cognitive function in asymptomatic cerebral ischemia," International Journal of Cardiology, 2012, Received Jul. 2011, vol. 157, pp. 104-107.
Richard E. et al., "Prevention of dementia by intensive vascular care (preDIVA); a cluster-randomised trial in progress," Chapter 4.1 Alzheimer disease and associated disorders, Jul. 2009, pp. 46 to 58.
Dickstein D. L. et al., "Role of Vascular Risk Factors and Vascular Dysfunction in Alzheimer's Disease," Mount Sinai Journal of Medicine, 2010, Published Jan.-Feb. 2010, vol. 77, pp. 82-102.
Power M.C. et al., "The association between blood pressure and incident Alzheimer disease: a systematic review and meta-analysis," Epidemiology, 2011, Sep. 2011, vol. 22(5), pp. 646-659.
European Search Report received for co-pending European Patent Application No. 16834323.4, Date of Mailing: Apr. 16, 2019, Applicant: The Brain Protection Company PTY Ltd, 10 pages.
English Translation of First Office Action received for co-pending Chinese Patent Application No. 201680048180.8, Date of Mailing: May 13, 2019, Applicant: The Brain Protection Company PTY Ltd, 3 pages.
Examination Report received for co-pending Australian Patent Application No. 2016306711, Date of Mailing: Feb. 7, 2019, Applicant: The Brain Protection Company PTY Ltd, 4 pages.
International Search Report and Written Opinion issued for International Application No. PCT/US19/63294, Applicant: The Brain Protection Company Pty Ltd, Date of Mailing: Apr. 24, 2020, 17 pages.
International Search Report and Written Opinion issued for International Application No. PCT/US19/63309, Applicant: The Brain Protection Company Pty Ltd, Date of Mailing: Apr. 21, 2020, 12 pages.
International Preliminary Report on Patentability received for International PCT Application No. PCT/AU2018/051191 filed Nov. 2, 2018; Applicant: The Brain Protection Company Pty Ltd; Date of Mailing: Feb. 10, 2020, 20 pages.
International Search Report and Written Opinion received for International PCT Application No. PCT/AU2018/051191 filed Nov. 2, 2018; Applicant: The Brain Protection Company Pty Ltd; Date of Mailing: Jan. 18, 2019, 20 pages.
International Search Report and Written Opinion received for International PCT Application No. PCT/AU2019/051101, filed Oct. 11, 2019; Applicant: The Brain Protection Company Pty Ltd; Date of Mailing: Dec. 19, 2019, 16 pages.
Sun et al., "Post-stroke cognitive impairment: epidemiology, mechanisms and management," Annals of Translational Medicine, 2014;2(8):80, published on Jul. 18, 2014, 16 pages.
International Preliminary Report on Patentability received for International PCT Application No. PCT/AU2020/051377, filed Dec. 16, 2020; Applicant: The Brain Protection Company Pty Ltd; Date of Mailing: Mar. 29, 2022, 20 pages.

\* cited by examiner

DEVICE AND METHOD FOR ALTERING BLOOD FLOW CHARACTERISTICS IN A VESSEL

TECHNICAL FIELD

The present disclosure relates to a device and method for altering blood flow characteristics in a vessel. The vessel is particularly a carotid artery, but may be any vessel (artery or vein). In particular, the device and method are intended for preventing or at least reducing the risk of cognitive decline. However, it will be appreciated by those skilled in the art that the invention may be used in other medical applications.

BACKGROUND OF THE INVENTION

Figure 1:
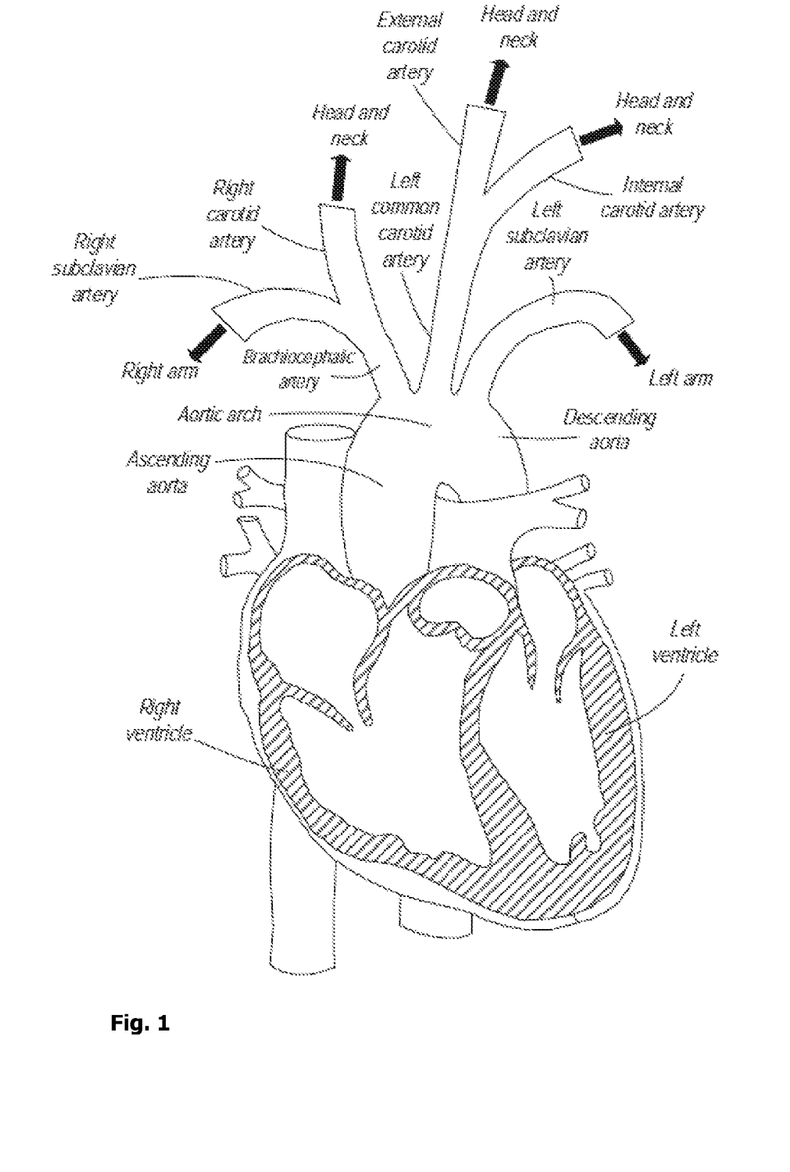
FIG. 1 is a schematic diagram of a human heart.

The heart supplies oxygenated blood to the body through a network of interconnected, branching arteries starting with the largest artery in the body, the aorta. As shown in the schematic view of the heart and selected arteries in FIG. 1, the portion of the aorta closest to the heart is divided into three regions: the ascending aorta (where the aorta initially leaves the heart and extends in a superior direction), the aortic arch, and the descending aorta (where the aorta extends in an inferior direction). Three major arteries branch from the aorta along the aortic arch: the brachiocephalic artery, the left common carotid artery, and the left subclavian artery.

The brachiocephalic artery extends away from the aortic arch and subsequently divides into the right common carotid artery, which supplies oxygenated blood to the head and neck, and the right subclavian artery, which predominantly supplies blood to the right arm. The left common carotid artery extends away from the aortic arch and supplies the head and neck. The left subclavian artery extends away from the aortic arch and predominantly supplies blood to the left arm. Each of the right common carotid artery and the left common carotid artery subsequently branches into separate internal and external carotid arteries.

The descending aorta extends downwardly and defines the descending thoracic aorta and subsequently the abdominal aorta before branching into the left and right iliac arteries. Various organs of the body are supplied by arteries which junction with and are supplied by the descending aorta.

During the systole stage of a heartbeat, contraction of the left ventricle forces blood into the ascending aorta that increases the pressure within the arteries (known as systolic blood pressure). The volume of blood ejected from the left ventricle creates a pressure wave, known as a pulse wave, which propagates through the arteries propelling the blood. The pulse wave causes the arteries to dilate. When the left ventricle relaxes (the diastole stage of a heartbeat), the pressure within the arterial system decreases (known as diastolic blood pressure), which allows the arteries to contract. This is characterised by a sequence of forward and reverse compression waves and forward and reverse expansion waves.

The difference between the systolic blood pressure and the diastolic blood pressure is the "pulse pressure," which generally is determined by the magnitude of the contraction force generated by the heart, the heart rate, the peripheral vascular resistance, and diastolic "run-off" (e.g., the blood flowing down the pressure gradient from the arteries to the veins), amongst other factors. High flow organs, such as the brain, are particularly sensitive to excessive pressure and flow pulsatility. Other organs such as the kidneys, liver and spleen may also be damaged over time by excessive pressure and flow pulsatility.

To ensure a relatively consistent flow rate to such sensitive organs, the walls of the arterial vessels expand and contract in response to the pressure wave to absorb some of the pulse wave energy. As the vasculature ages, however, the arterial walls lose elasticity, which causes an increase in pulse wave speed and wave reflection through the arterial vasculature.

Arterial stiffening impairs the ability of the carotid arteries and other large arteries to expand and dampen flow pulsatility, which results in an increase in systolic pressure and pulse pressure. Accordingly, as the arterial walls stiffen over time, the arteries transmit excessive force into the distal branches of the arterial vasculature.

Research suggests that consistently high systolic pressure, pulse pressure, and/or change in pressure over time (dP/dt) increases the risk of dementia, such as vascular dementia (e.g., an impaired supply of blood to the brain or bleeding within the brain, or a high pulse pressure). Without being bound by theory, it is believed that high pulse pressure can be the root cause or an exacerbating factor of vascular dementia and age-related dementia (e.g., Alzheimer's disease). As such, the progression of vascular dementia and age-related dementia (e.g., Alzheimer's disease) may also be affected by the loss of elasticity in the arterial walls and the resulting stress on the cerebral vessels. Alzheimer's disease, for example, is generally associated with the presence of neuritic plaques and tangles in the brain. Recent studies suggest that increased pulse pressure, increased systolic pressure, and/or an increase in the rate of change of pressure (dP/dt) may, over time, cause microbleeds within the brain that may contribute to the neuritic plaques and tangles.

Increased pulse pressure is a hallmark of vascular aging, and has recently been identified to be a potential risk factor for cognitive decline and dementia due to its destructive impact on the fragile microvasculature of the brain.

There is research supporting the relationship between high blood pressure in middle ages and later cognitive decline or dementia.

Blood pressure is routinely measured and used as an indicator of the presence of various possible underlying conditions. However, blood pressure measurement alone is not a suitable gauge of cognitive decline. This is because a patient's blood pressure may be elevated or varied as a result of various factors which may be unrelated to cognitive decline.

The likely actual cause of brain damage from high pulse pressure is the "intensity" of the carotid wave as it travels forward into the brain. Accordingly, an increase in the amplitude of pulse-generated waves travelling toward the brain could be an important risk factor for later cognitive decline.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a device for altering blood flow characteristics in a vessel, the device comprising:

a cuff configured to be surgically positioned around a portion of the vessel;

a first abutment formation located on an internal wall of the cuff, wherein the abutment formation:

locally reduces a cross-sectional area of a passageway extending through the cuff and/or defines a passageway within the cuff which is non-linear.

The passageway is preferably curved about one or more axes which extend generally perpendicular to the direction of blood flow.

The first abutment formation is preferably defined by a first pad.

The device further preferably comprises a second pad and a third pad, wherein the three pads a longitudinally separated within the cuff, and spaced around the circumference of the cuff.

The three pads are preferably evenly spaced circumferentially at about 120 degrees relative to each adjacent pad.

The device further preferably comprises a second pad diametrically opposed relative to the first pad, and in axial alignment with the first pad, defining a first pair of pads.

The device further preferably comprises a second pair of pads which are also diametrically opposed and axially aligned.

The first pair of pads is preferably longitudinally spaced relative to the second pair of pads to define an expansion chamber within the cuff.

The device further preferably comprises a third pair of pads which are also diametrically opposed and axially aligned.

The first pair of pads is preferably located adjacent to a proximal end of the device and the second pair of pads is preferably located adjacent to a distal end of the device, the first and second pairs of pads being in circumferential alignment.

The third pair of pads is preferably located between the first pair of pads and the second pair of pads, further wherein the third pair of pads is circumferentially offset by about 90 degrees.

The pads are preferably gel filled.

The cuff is preferably defined by a generally tubular body.

The cuff preferably includes a longitudinally extending seam which permits the cuff to be placed around the vessel.

The seam is preferably defined by first and second longitudinally extending arms which are selectively securable to each other.

The cuff is preferably defined by an elastically deformable helical body which is coated in a compliant layer.

The elastically deformable helical body is preferably fabricated from Nitinol™ and the compliant layer is preferably fabricated from silicone.

A radially internal surface of the compliant layer is preferably curved, such that a cross sectional area of the compliant layer is generally "D" shaped when sectioned through a plane which is parallel with and passes through a longitudinal axis of the helical body. However, it will be appreciated that different shapes and dimensions can be provided along the length of the section of compliant layer.

A radially internal surface of the compliant layer preferably includes at least one inwardly extending projection.

In a second aspect, the present invention provides a method of altering blood flow characteristics within a vessel, the method including the steps of:

surgically positioning a cuff around a portion of the vessel, and locally altering blood flow characteristics in the vessel with one or more abutment formation located within the cuff, the abutment formation:

reducing a cross-sectional area of a passageway extending through the vessel and/or deforming the vessel to define a region which is curved about one or more axes which extend generally perpendicular to the direction of blood flow.

In a third aspect, the present invention provides a device for altering blood flow characteristics in a vessel, the device comprising:

a helical cuff configured to be surgically positioned around a portion of the vessel, a first abutment formation defined by an internal wall of the helical cuff, and a central spine located within the helical cuff, wherein the abutment formation:

locally reduces a cross-sectional area of a passageway extending through the cuff and/or changes a cross-sectional shape of the passageway extending through the cuff and/or defines a passageway within the cuff which is non-linear.

A cable is preferably located adjacent to the central spine, the cable extends between proximal and distal ends of the device, the cable length being selectively adjustable to change the shape of the helix, such that shortening the cable reduces a pitch of the helix and increases a diameter of the helix.

A cross section of the central spine preferably varies along the length of the device between proximal and distal ends.

A cross-section of the helical cuff preferably varies along the length of the device between proximal and distal ends.

The device further preferably comprises one or more sensors located on the helical cuff for obtaining data relating to blood flow characteristics within the vessel and/or vessel characteristics.

The sensors preferably include one or more of electrodes, pressure sensors and ultrasonic emitters.

The sensor(s) is preferably located on a radially internal portion of the helical cuff, positionable in direct abutment with the vessel.

The sensors are preferably configured to wirelessly communicate with a computer or other such device to transmit information concerning measured blood flow characteristics and/or vessel characteristics.

A cross sectional shape of the passageway preferably varies along the length of the device between proximal and distal ends.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

There are disclosed herein several embodiments of devices 15, 50, 55, 60, 100, 200 for altering blood flow characteristics in the form of an external cuff or band 10 which is surgically placed around the external wall of a blood vessel 20, preferably the carotid artery, including the common carotid artery or the internal carotid artery. The cuff 10 deforms the arterial wall and as a result alters the blood flow characteristics within a passage 9 of the vessel 20, by changing the geometry of the vessel 20 such that along the length of the cuff 10, the vessel 20 wall profile is altered. The change in vessel 20 structure may result in a change of cross-sectional shape, and/or cross-sectional area and/or vessel curvature or bending about an axis which extends generally perpendicular to the direction of flow (i.e. the vessel is locally made non-linear).

The device 15, 50, 55, 60, 100, 200 is preferably placed around the outside of the common carotid artery. Its intended function is to modify the dynamics of transmission of arterial blood pressure to the cerebral microvasculature and to absorb excess energy from the arterial pulse.

Each embodiment of the device 15, 50, 55, 60, 100, 200 includes a member which is placed around the vessel during a surgical procedure.

In each embodiment described herein, the device 15, 50, 55, 60, 100, 200:

locally reduces or changes the shape of a cross-sectional area of a vessel 20; and/or deforms the vessel 20 extending through the passageway 25 which is non-linear and typically curved or bent about one or more axes which extend generally perpendicular to the direction of blood flow (i.e. the vessel is made locally non-linear).

First Embodiment

Figure 2:
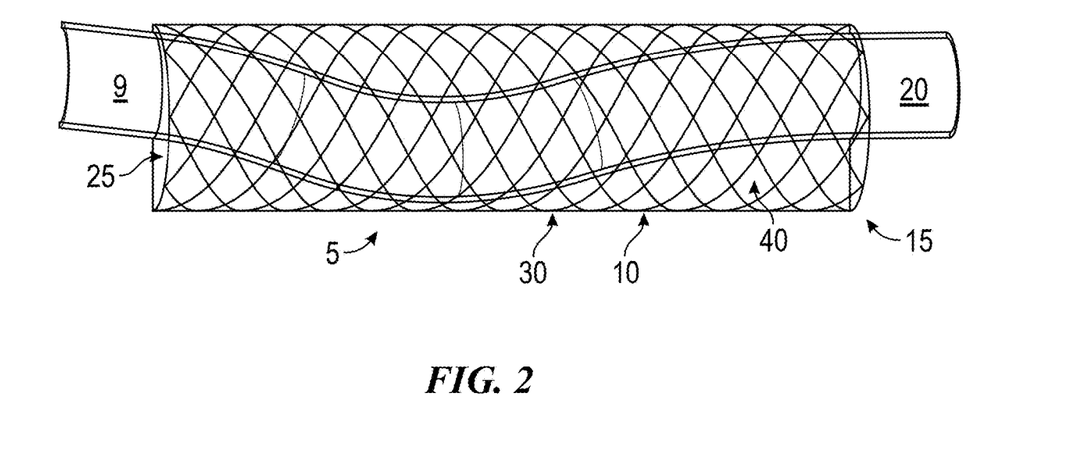
FIG. 2 is a schematic view of a device for modifying blood flow characteristics according to a first embodiment of the invention.
Figure 3:
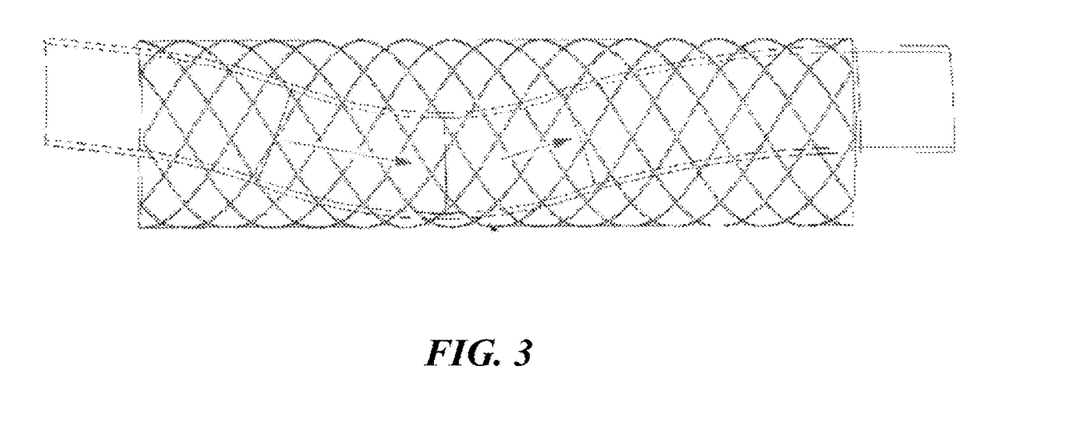
FIG. 3 is a further schematic view of the device of FIG. 2.

In the first embodiment, depicted in FIGS. 2 and 3, the device 15 includes a cuff 10 which forces a portion of the vessel 20 to adopt a bent or curved profile, having curvature about one or more axes which extend generally perpendicular to the direction of blood flow (i.e. the vessel 20 becomes locally non-linear). As depicted, the cuff 10 includes an outer scaffold 30 fabricated from a suitable biocompatible material such as stainless steel or Nitinol. The scaffold 30 may be formed as two halves and located around the vessel and attached to each other. Alternatively, the scaffold may be fabricated as a single component which is sufficiently compliant to allow it to be wrapped around the vessel, prior to subsequent attachment of the two opposing sides to define a generally tubular cuff 10.

Abutment formations in the form of pads or buffers 40 are located on the radial inner wall of the cuff 10. The pads 40 are preferably gel pads 40 and may be defined by a single gel pad 40, or a plurality of independent gel pads 40. In the embodiment shown in FIGS. 2 and 3, the gel pads 40 cause the deformation of the vessel 20, forcing the vessel 20 to adopt a curving profile, within the wall of the scaffold 30 which is generally locally cylindrical. The curvature of the deformed vessel 20 as depicted schematically in FIG. 1 has a central concave region and adjacent convex regions, such that the blood flow path is significantly diverged away from linear.

The pads 40 are not limited to gel pads, and may be fabricated from other material such as polymers of varying hardness or gas filled cushions.

The gel pads 40 serve two purposes. Firstly, the gel pads 40 define the desired deformation in the wall of the blood vessel 20. Secondly, the gel pads 40 dampen the energy carried by the blood flow when the blood flow comes into contact with the wall of the vessel 20, as the outer wall of the vessel 20 is in direct abutment with the gel pads 40.

Due to the deformation of the vessel 20, the blood flow is forced to adopt a non-linear path within the cuff 10. Accordingly, the pressure wave, which travels axially within a vessel 20, contacts the wall of the vessel 20, which in turn is supported against the gel pad 40. The gel pad 40 absorbs some of the energy carried by the blood flow.

Furthermore, the deformation of the vessel 20 results in the reflected portion of the pressure wave being non-axial relative to the vessel 20. This typically results in the reflected wave coming into contact with the wall of the vessel 20 at several other locations, which may also reduce the energy intensity carried by the pressure wave downstream of the cuff 10.

In the first embodiment of FIGS. 2 and 3, the gel pad 40 and the cuff 10 are arranged to introduce curvature into the vessel 20, while maintaining a generally circular cross-sectional area in the vessel 20, such that the vessel 20 generally maintains native diameter. In an alternative embodiment, in addition to introducing curvature in the vessel 20, the cuff 10 may also alter the cross-sectional area or shape of the vessel 20. For example, the vessel along its length can be partially flattened into an oval or elliptical cross-section, which has a cross-sectional area which is less than the native cross-sectional area of the vessel 20. The modified cross-section of the vessel 20 may be any shape, but typically the overall cross-section is flattened and widened.

Such partial flattening of the vessel 20 may desirably increase the ability of the vessel to become curved, due to the ribbon-like cross-sectional profile (once flattened) being more readily deformed.

The diameter (and length) of the passageway 25 passing through the tubular scaffold 30 relative to the native outer diameter of the vessel 20 defines the amount of curvature of the vessel which may be introduced by a given cuff 10.

Second Embodiment

Figure 4:
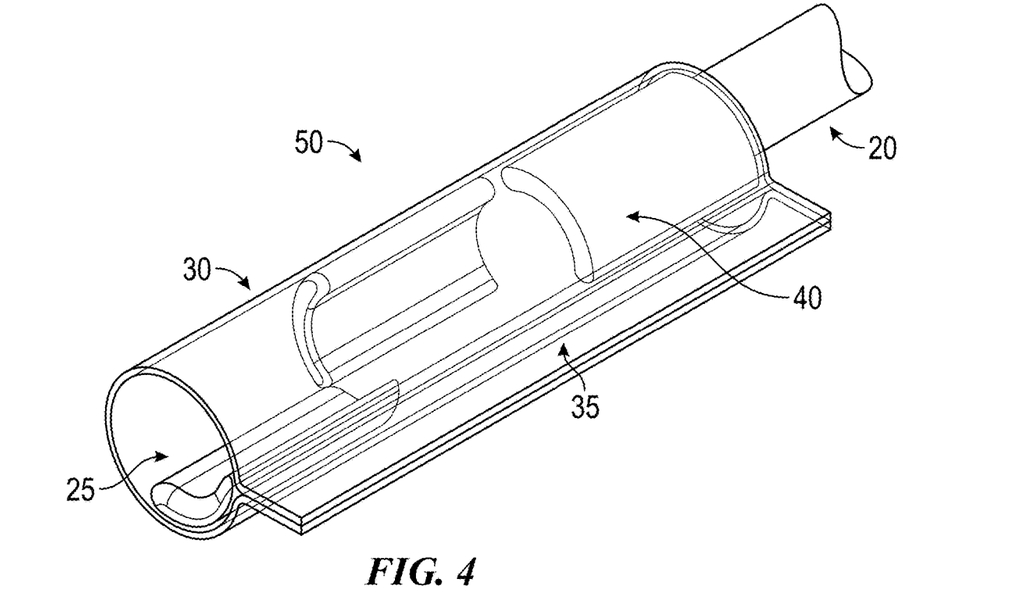
FIG. 4 depicts a device for modifying blood flow characteristics according to a second embodiment of the invention.

A second embodiment of the device 50 is depicted in FIG. 4. In this embodiment, there are three gel pads 40, arranged around the circumference of the cuff 10. Each of the gel pads 40 is approximately evenly spaced longitudinally. Circumferentially the gel pads 40 are offset at approximately 120 degrees relative to each adjacent gel pad 40. The radial spacing of the gel pads 40 forces the blood flow to follow a more circuitous (non-linear) path. Furthermore, this arrangement promotes several points of contact where the axial pressure wave carried by the blood flow is forced to contact the vessel 20 wall at a location which is supported by one of the gel pads 40.

Due to the presence of the three gel pads 40, when looking axially though the vessel 20, there is a limited cross-sectional area within the vessel 20 which is unaffected by any one of the gel pads 40. In some arrangement, it may be the case that there is no direct line of site through the vessel 20 due to the level of deformation provided by the gel pads 40. However, because the gel pads 40 are axially spaced, each gel pad 40 only partially restricts or changes the shape of the local cross-sectional area of the vessel 20. Accordingly, the volumetric blood flow through the device 50 is not significantly affected, as the local cross-sectional area of the vessel 20 is not changed significantly relative to the natural cross-sectional area of the vessel 20 at any location. As such, the device 50 is able to deflect and/or absorb some of the energy carried by the pressure wave without significantly obstructing the volumetric blood flow rate.

As shown in FIG. 4, the scaffold is defined by a tube which is placed around the vessel and has a longitudinal split defining two arms 35. The arms 35 may be secured to each other with welding, stitching, gluing, stapling, corresponding male and female engagement formations or some other means which permits the arms 35 to be attached to each other quickly during surgery. It will be appreciated that in an embodiment in which the scaffold is made from a metallic material such as nitinol, the engagement may not be necessary.

Third Embodiment

Figure 5:
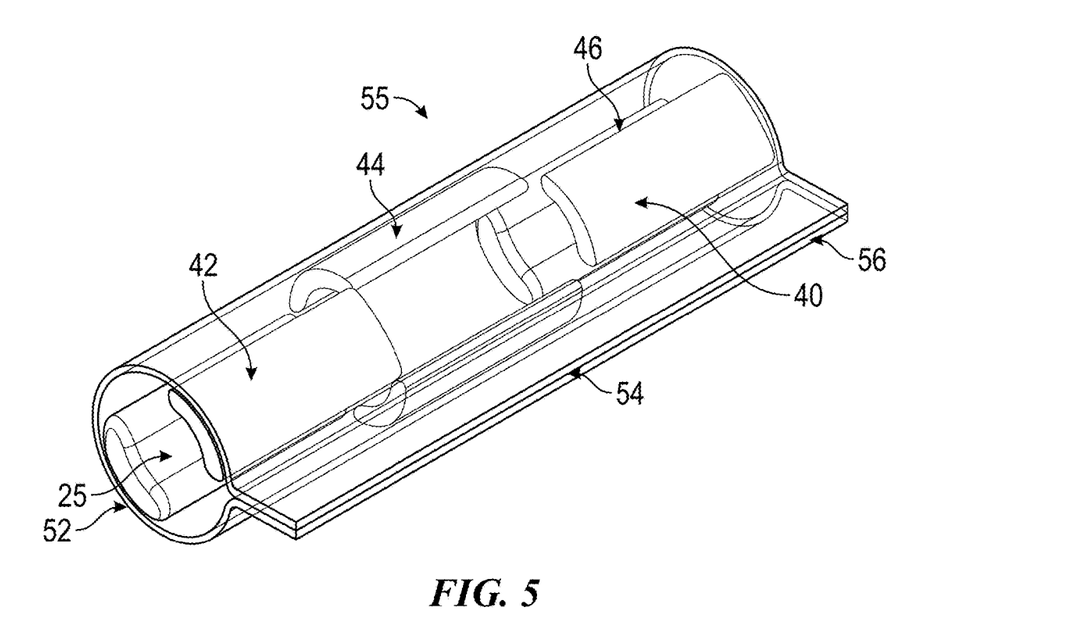
FIG. 5 depicts a device for modifying blood flow characteristics according to a third embodiment of the invention.

A third embodiment of the device 55 is depicted in FIG. 5. The third embodiment is functionally similar to the second embodiment described above. However, there are three pairs of gel pads 40. The first pair of gel pads 42 are arranged diametrically opposite each other at a first (proximal) end 52 of the device 55. A second pair of gel pads 46 is arranged diametrically opposite each other, generally at a second (distal) end 56 of the device 55.

A third pair of gel pads 44 are arrange adjacent to the first pair, at a longitudinally central region 54 of the device 55. The third pair of gel pads 44 is circumferentially offset relative to the first and second pairs of gel pads 42, 46 by about 90 degrees.

Each pair of gel pads 42, 44, 46 locally flattens the vessel 20, such that the vessel 20 locally adopts an oval or elliptical profile, or at least a non-circular profile. In this way, at the junction between each pair of gel pads 42, 44, 46, the pressure waves contact with a step like change in vessel 20 geometry.

Similar to the second embodiment described above, when looking axially though the vessel 20, there is a limited cross-sectional area within the vessel 20 which is unaffected by any one of the gel pads 40, and located in the radial centre of the vessel 20.

Fourth Embodiment

Figure 6:
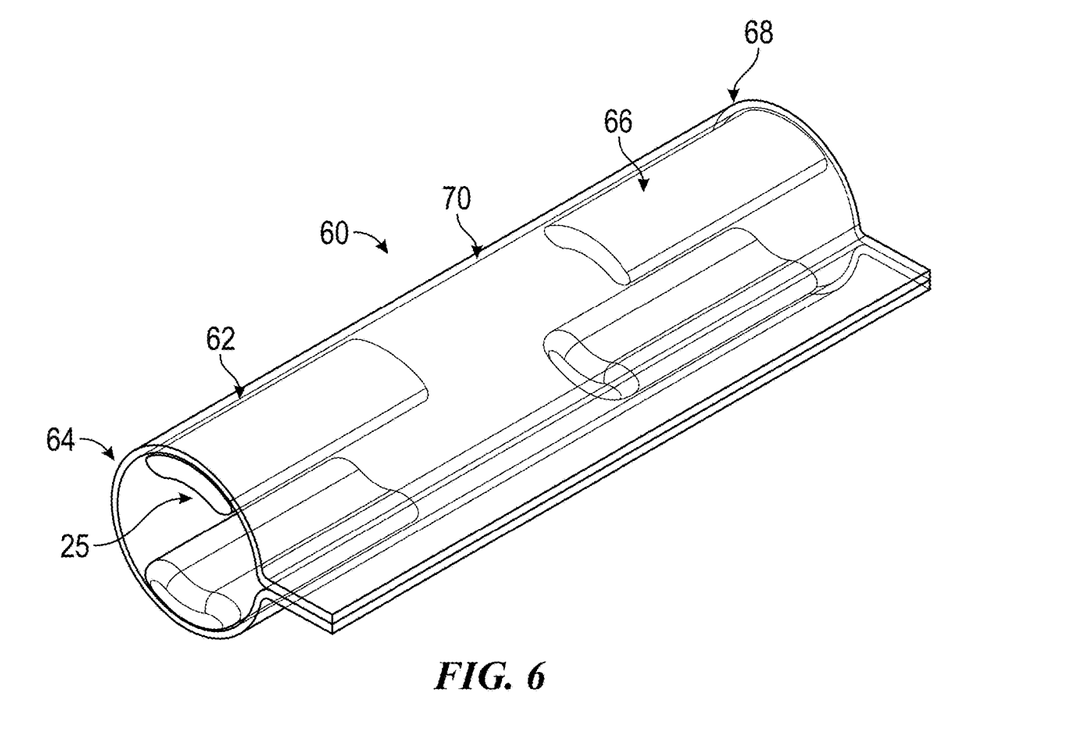
FIG. 6 depicts a device for modifying blood flow characteristics according to a fourth embodiment of the invention.

A fourth embodiment of the device 60 is depicted in FIG. 6. The fourth embodiment is similar to the third embodiment described above but the central pair of gel pads are omitted. As such, in the fourth embodiment, there is a first pair of gel pads 62 located at a first end 64 of the device 60, and a second pair of gel pads 66 located at an opposing second end 68 of the device 60.

In the fourth embodiment, the space between the sets of gel pads 62, 66 defines an expansion chamber 70, located in a longitudinally central region of the device 60. The expansion chamber 70 permits the vessel 20 to locally expand or balloon, which may result in remodelling of the vessel geometry and which may reduce pressure within the vessel 20. The expansion of the portion of the vessel 20 located within the region of the expansion chamber 70 may occur permanently within the device 60, or as a result of changes in blood pressure within the vessel.

In a variation of the fourth embodiment, not shown in the drawings, the gel pads 62, 66 may be circumferentially angularly offset relative to each other by about 90 degrees, and with the expansion chamber 70 located in between.

Whilst the pads described in each embodiment have been described as separately formed components, it will be appreciated that the pads may be integrally formed with the cuff 10.

Fifth Embodiment

A fifth embodiment of the device 100 is depicted in FIGS. 7 to 11. The device 100 has a generally helical body or cuff 110, and in a similar manner to the earlier described embodiments, the device 100 is intended to be externally placed around the outside of the common carotid artery or the internal carotid artery.

The device 100 has a helical profile, so that it can be placed around the vessel 20 with minimal disturbance during a surgical procedure, with the elasticity of the device 100 permitting the vessel 20 to be seated radially within the central passageway 25 extending longitudinally through the helix of the device 100.

The device 100 includes a central spine 120 fabricated from an elastically deformable material such as medical grade Nitinol™ or another suitable metal, metal alloy or polymer. The spine 120 is sheathed in a covering of silicone 130 or another suitable polymer. The silicone 130 is compliant, and reduces the risk of any damage to the external wall of the vessel 20. Whilst the device is depicted with the covering of silicone 130, it could alternatively be fabricated without the covering 130 such that the spine 120 defines the external surface for abutment with the vessel 20.

The device 100 is a single piece device with no articulated parts, constructed in the form of an open spiral helix with a total length of preferably about 45 mm, but may be provided in different lengths, in the range of 20-55 mm for the common carotid artery but may be longer or shorter in other vessels 20.

Figure 7:
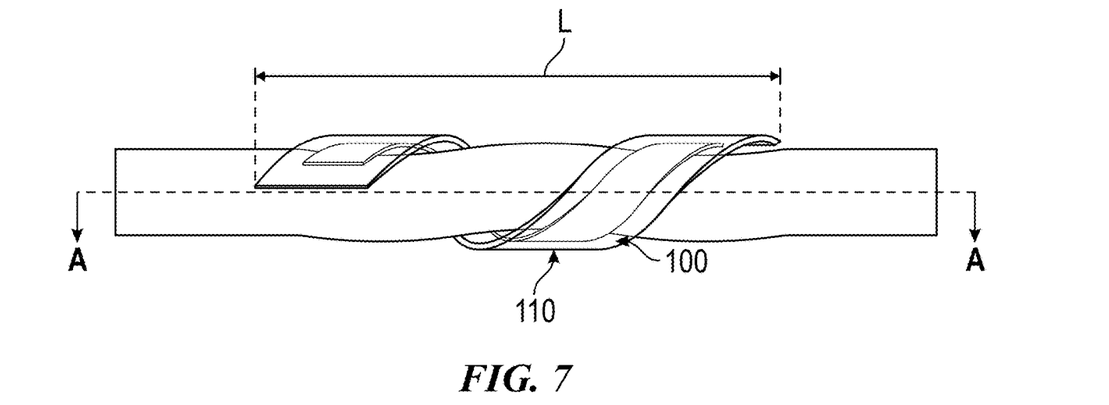
FIG. 7 is side view of a device for modifying blood flow characteristics according to a fifth embodiment when deployed.

As depicted in FIG. 7, the device 100 is designed to fit around the outside of the common carotid artery or internal carotid artery, and deflects the artery (smoothly and continuously) along the length of the artery segment. For example, an 8 mm diameter common carotid artery would be deflected approximately 6 degrees from its long axis a number of times as it passes through the device 100. The artery 20 resumes its native path on exiting the device 100. The internal helix diameter of the device 100 defining the central passageway 25 is chosen to be less than the local artery external diameter in order to suitably deflect the artery. However, since the device 100 deforms the artery only at points of contact, that is, along the helix, it does not substantially alter the cross-sectional area nor the shape of the artery, because at no point does the device completely encircle the artery. If the pitch is small enough, the device 100 can reduce the diameter of the artery. In that case it can deflect as well as reduce the cross-sectional area of the artery. The pitch of the device 100 may be constant or variable. If the helix pitch is sufficiently fine, the device 100 may behave like a continuous tube, with minimal or no clearance between adjacent crests of the helix.

Figure 10:
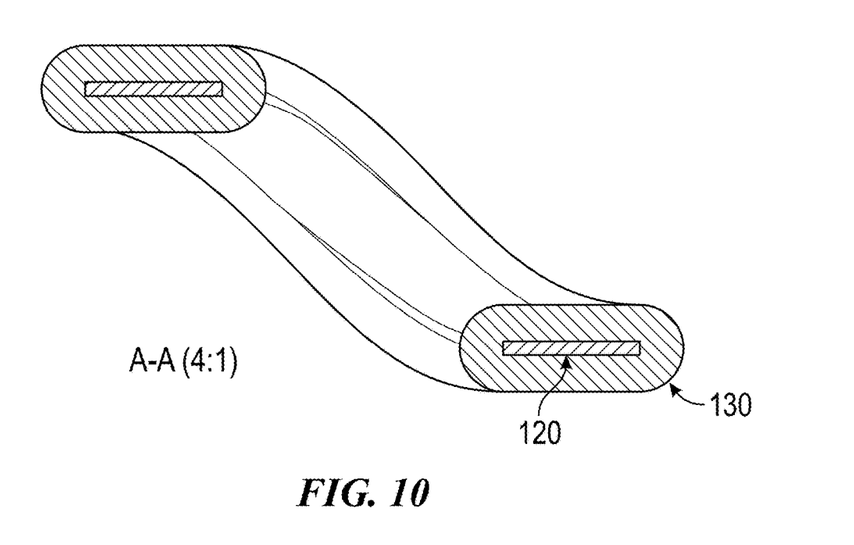
FIG. 10 is a cross-sectional side view of a portion of the device of FIG. 7.

As depicted in FIG. 10, the central helical spine 120 is fabricated from a wound plate section of Nitinol™, such that the spine 120 is wound about the longitudinal helix axis As such, the spine 120 is resiliently deformable, and can be unwound to wrap around the vessel 20 before springing back to the native diameter of the device 100. The helical spine 120 is preferably preformed in a self supporting helix and fabricated for example in a heat-set process.

Referring to FIG. 10, the cross-sectional shape of the silicone covering 130 is generally contoured, such that the profile is an obround, ellipse, oval or another such formation. This creates gradual deformation of the vessel 20, and reduces the risk of damage to the vessel 20. This also assists to create a gradual transition within the vessel 20 from the region of native diameter to the region which is deformed by the device 100.

Figure 11:
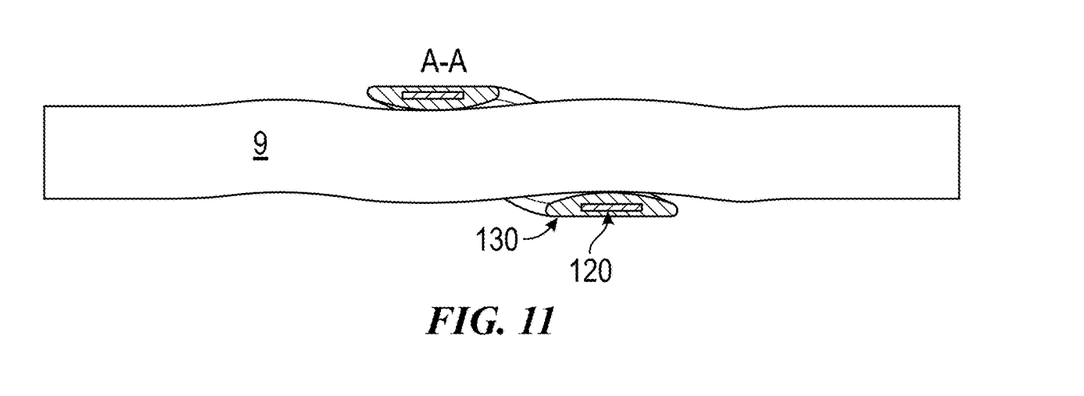
FIG. 11 is a cross-sectional side view of a portion of the device of FIG. 7 when deployed.

In one embodiment depicted in FIG. 11, the radially outer surface of the silicone 130 may be defined by a portion of a cylinder or tube, such that the radially outer surface is locally parallel with a longitudinal axis of the device 100. In contrast, the radially internal surface of the silicone 130 is curved, such that the cross-sectional area of the silicone 130 is generally "D" shaped when sectioned through a plane which is parallel with and passes through a longitudinal axis of the helix.

The device 100 is intended to locally alter the vessel by changing its shape and/or diameter and/or flow direction. For example, the device 100 may reduce the native cross-sectional area of the vessel by between about 5% and 30% and preferably by between about 10% and 20% and most preferably about 15%. However, the reduction in cross-sectional area may be higher, and up to 50%. In order to accommodate vessels of different cross-sectional area, the device 100 is fabricated in different helix diameters, and the device 100 having the most suitable dimensions is chosen before the surgical procedure to achieve an optimal fit to the patient's vessel geometry, and the intended restriction in cross-sectional area. It is envisaged that the device 100 may be supplied in about 12 different sizes, and the preferred size may be determined by imaging the vessel 20 prior to surgery. Another means of reducing the passageway 25 in the device 100 is by changing the silicone covering 130 to a thicker or thinner version on the inside of the device. Also, by placing a cable at one end and pulling from the other end, the device may be shortened and inner diameter increased. For this purpose, the nitinol spine may be a hollow tube. The cable may be shortened or lengthened by rotating a screw on one end of the device as described in the sixth embodiment below.

Figure 8:
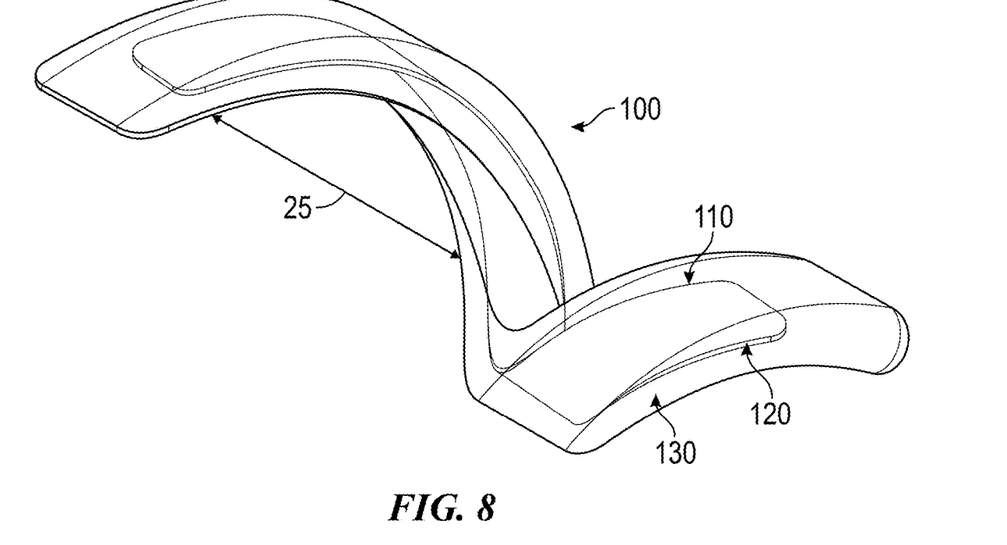
FIG. 8 is a perspective view of the device of FIG. 7.
Figure 9:
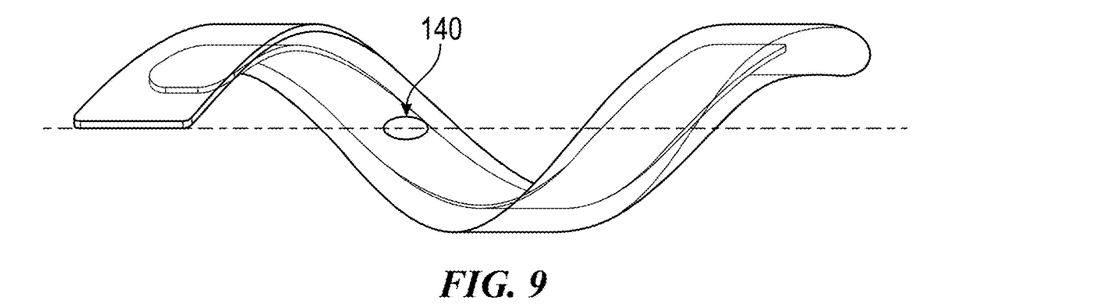
FIG. 9 is a further side view of the device for modifying blood flow characteristics according to FIG. 7.

In the embodiment depicted in FIGS. 7 to 9, the length of the device 100 is equal to a multiple of approximately 1.5× the pitch. It will be appreciated that the length of the device 100 may be some other multiple of the pitch, for example between about 1 and 2× pitch. In more extreme cases the coil can be up to 30× the pitch or more. Alternatively, the device 100 may be provided in a fixed length, not related to pitch.

Referring to FIG. 9, inwardly extending projections 140 may be formed on the internal wall of the silicone covering 130. The projections 140 assist to further locally deform the vessel 20. The projections 140 may be intermittently spaced along the length of the helix and are each directed radially inwardly.

It will be appreciated that the ratio of the cross-sectional area of the Nitinol™ spine 120 relative to the silicone 130 may vary beyond the embodiment depicted in the drawings. For example, by providing the Nitinol™ in a thicker cross-sectional area, the stiffness of the device 100 may be increased. It will be appreciated that the nitinol may vary in cross-section along the length, so the ends are stiff and middle is soft for instance.

The helix device 100 of the fifth embodiment operates in a similar manner to the earlier described embodiment of FIG. 4. As shown in that drawing, the pads 40 are arranged in a formation which is functionally similar to the helix of the fifth embodiment. Similarly, the silicone of the fifth embodiment which is located on the internal surface of the helix provides cushioning against the external wall of the vessel, in a similar manner to the pads 40 of the first to fourth embodiments.

Sixth Embodiment

A sixth embodiment of the device 200 is depicted in FIGS. 12 to 16, being a variation on the fifth embodiment 100. The device 200 has a generally helical body or cuff 210, and in a similar manner to the earlier described embodiments, the device 200 is intended to be externally placed around the outside of the common carotid artery or the internal carotid artery (or another suitable vessel).

The radially inner wall of the cuff 210 may be smooth or textured.

The device 200 has a helical profile, so that it can be placed around the vessel 20 with minimal disturbance during a surgical procedure, with the elasticity of the device 200 permitting the vessel 20 to be seated radially within the central passageway 25 extending longitudinally through the helix.

The device 200 includes a central spine 220 fabricated from an elastically deformable material such as medical grade Nitinol™, stainless steel, or another suitable metal, metal alloy or polymer. The spine 220 is sheathed in a covering of silicone 230, or another biocompatible polymer. The silicone covering 230 is compliant, may contain and/or release a drug and reduces the risk of any damage to the external wall of the vessel 20.

Figure 12:
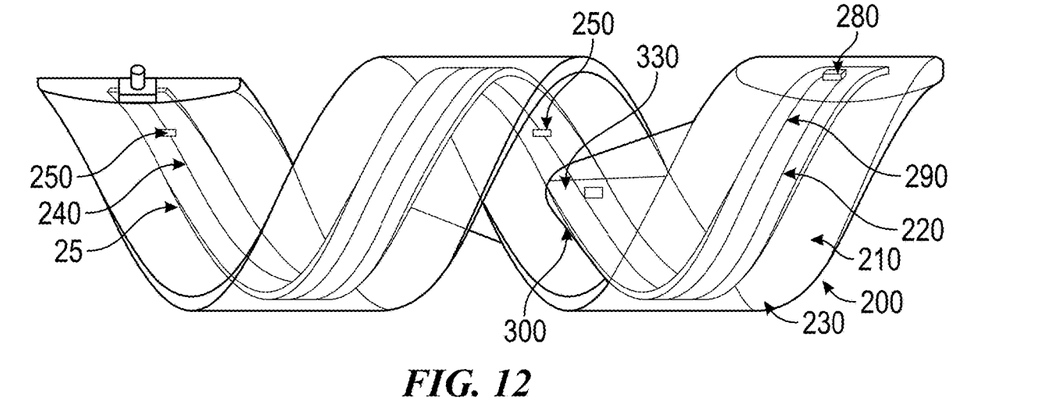
FIG. 12 is a front view of a device according to a sixth embodiment.

Referring to FIG. 12 for example, a tensioning wire or cable 240 extends through the helix, adjacent to the central spine 220. In the preferred embodiment, the tensioning wire 240 is secured to the central spine 220 with a number of spaced anchoring points 250. The anchoring points 250 may be provided in various different forms, such as lugs 250 with eyelets to receive the wire 240. Similarly, the tensioning wire 240 may be passed through the centre of a hollow spine 220.

Figure 14:
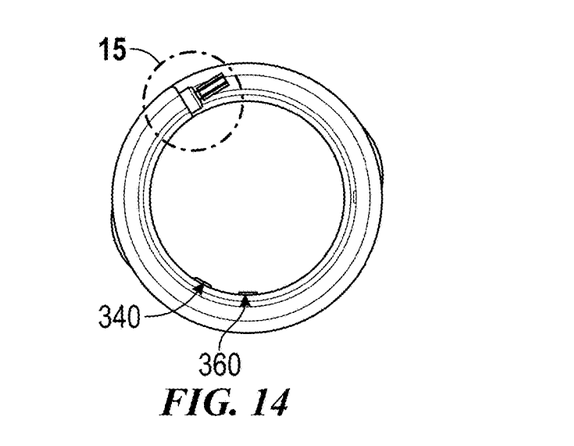
FIG. 14 is an end view of a device of FIGS. 12 and 13.
Figure 15:
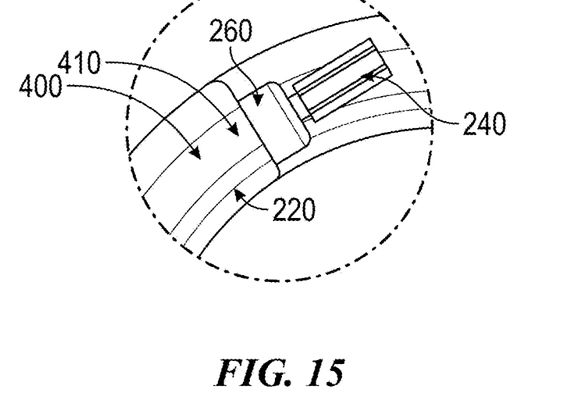
FIG. 15 is a partial detail of the end view of FIG. 14.
Figure 16:
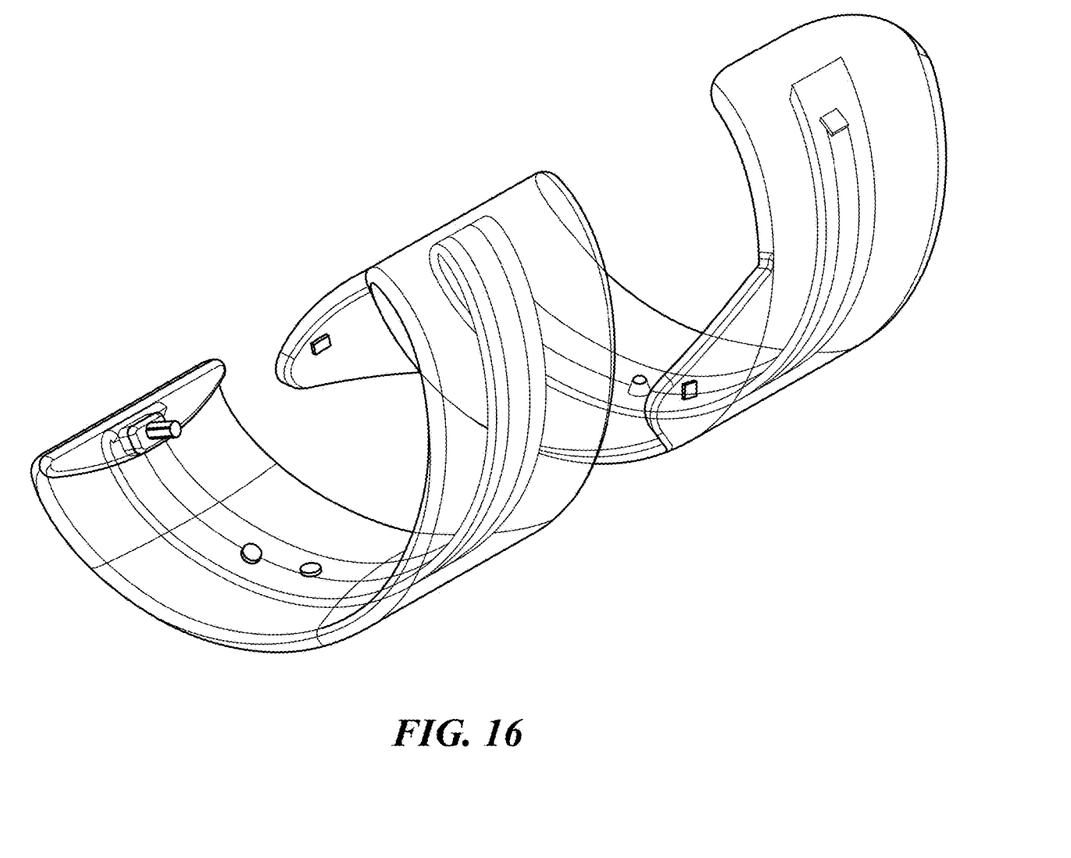
FIG. 16 is a perspective view of the device of FIGS. 12 to 15.

Referring to FIGS. 14 and 15, the cable 240 has an adjustment mechanism 260 located at one end of the device 200. The adjustment mechanism 260 may be in the form of an interacting thread and nut, a worm drive, a hose clamp type slotted screw, or some other mechanism which is configured to selectively mechanically shorten the length of the cable 240. By shortening the cable 240, because the cable is attached to the central spine 220 at each end, and intermittently with the anchoring points 250, shortening of the cable 240 results in the helix being reduced in length and increased in diameter. This has the effect of radially expanding the device 200 around the vessel.

The radial expansion or compression of the helix may be performed manually during installation, or alternatively, it may be performed remotely or mechanically in a post-operative procedure, as will be discussed below. For example, the cable 240 can be intermittently or occasionally adjusted, for example remotely or mechanically in a keyhole surgical procedure. Such adjustment can be performed to accommodate changes in the vessel, changes in the patient's blood flow characteristics or for any other purpose.

Referring to FIG. 12, the device 200 includes a radio component 280 and a copper coil winding 290, or other such antennae.

The radio component can receive signals, such as directing the helix to expand or contract in diameter.

Figure 13:
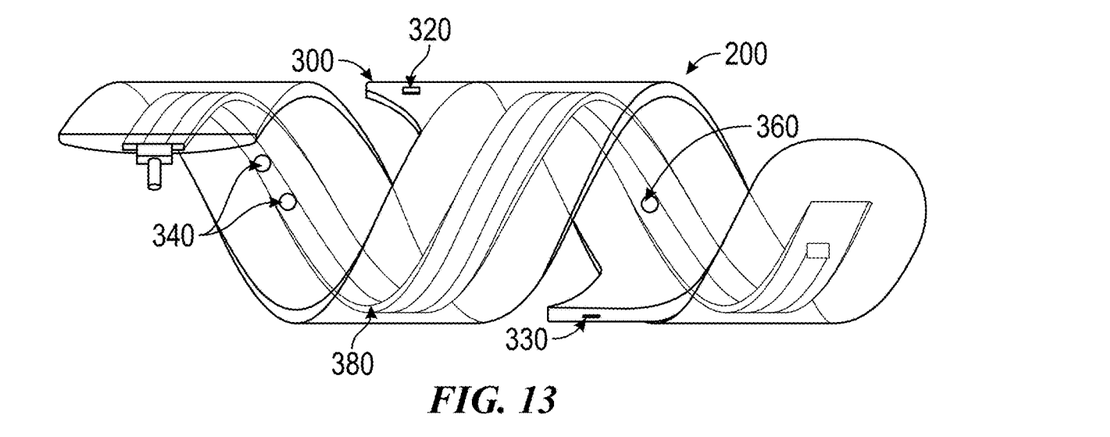
FIG. 13 is top view of the device of FIG. 12.

Referring to FIG. 13, the device 200 also includes tabs 300 that contain sensors that oppose other relevant components located on the helix, such that measurements can be taken on diametrically opposing sides of the helix. One such component may be a mirror or reflector 320 for ultrasound purposes, or an LED receiver 330.

Various sensors or communication devices may be provided on the spine 220 or sheathed covering of silicone 230, such as platinum electrodes, 340, a pressure sensor 360, an ultrasonic emitter 380.

In the preferred embodiment, the electrodes 340 and the pressure sensor 360 extend radially inwardly through the surface of the silicone covering 230, such that the electrodes 340 and the pressure sensor 360 can be placed into direct contact with the wall of the blood vessel 20.

Referring to FIG. 15, the central spine 220 may be fabricated from a sandwiched nitinol helix 400.

The sensors and adjustment mechanism of the device 200 may be controlled by a printed circuit board (PCB), such as the doubled-up flex PCB 410 depicted in FIG. 15.

In each of the embodiments described herein, the cuff 10 is typically around 40-50 mm in length, although it may be longer or shorter.

The vessel 20 when treated with the device of each of the $1^{st}$ to $4^{th}$ embodiments described above may be reduced in diameter by about 3% to 30%, and preferably about 5% to 15% and most preferably about 10% by each pad.

In the embodiments of FIGS. 2 to 6, changing the internal diameter of the device 15, 50, 55, 60 may be achieved by changing the dimensions of the silicone covering 130. In the embodiments of FIGS. 7 to 16, changing the internal diameter of the helix may be achieved by changing the dimensions (in particular the thickness) of the silicone covering 120 or the dimensions of the spine 130.

In addition, changing the internal diameter can be achieved by a mechanism such as cable foreshortening, for example as described with respect to the sixth embodiment.

It will be appreciated that the cross-section of the silicone covering 130 may be constant between the proximal and distal ends. Alternatively, the cross-section of the silicon covering 130 may vary between the proximal and distal ends. Similarly, there may be variation of cross-section of the central spine 220, which is preferably fabricated from Nitinol.

Advantageously, when placed around a vessel 20 such as the carotid artery, the cuff 10 does not significantly affect the blood flow rate, as the auto-regulation of the blood flow assists in maintaining the natural volumetric blood flow rate.

Although the invention has been described with reference to specific examples, it will be appreciated by those skilled in the art that the invention may be embodied in many other forms.

The invention claimed is:

1. A device for altering blood flow characteristics in a vessel, the device comprising:
   a helical cuff extending along a longitudinal axis and defining a passageway therethrough along the longitudinal axis, wherein the helical cuff is configured to be surgically positioned around a portion of the vessel such that the portion of the vessel is within the passageway, wherein the helical cuff includes a first abutment formation defined by an internal wall of the helical cuff and a central spine located within the helical cuff, and wherein the abutment formation extends radially inward toward the longitudinal axis such that the passageway is non-linear along the longitudinal axis to:
      locally reduces a cross-sectional area of the portion of the vessel extending through the cuff, and/or
      changes a cross-sectional shape of the portion of the vessel extending through the cuff,
   wherein the cuff is defined by an elastically deformable helical body which is coated in a compliant layer.

2. The device of claim 1, wherein the elastically deformable helical body is fabricated from Nitinol™ and the compliant layer is fabricated from silicone.

3. The device of claim 1, wherein a radially internal surface of the compliant layer is curved, such that a cross sectional area of the compliant layer is generally "D" shaped when sectioned through a plane which is parallel with and passes through a longitudinal axis of the helical body.

4. The device of claim 1, wherein a radially internal surface of the compliant layer includes at least one inwardly extending projection.

5. The device of claim 1, wherein a cable is located adjacent to the central spine, the cable extends between proximal and distal ends of the device, and a length of the cable being selectively adjustable to change a shape of the helical cuff, such that shortening the cable reduces a pitch of the helical cuff and increases a diameter of the helical cuff.

6. The device of claim 1, wherein a cross sectional area of the non-linear passageway varies along the-a length of the device between proximal and distal ends.

7. The device of claim 1, wherein a cross sectional shape of the non-linear passageway varies along the length of the device between proximal and distal ends.

8. The device of claim 1, wherein a cross-section of the helical cuff varies along a length of the device between proximal and distal ends.

9. The device of claim 1, further comprising one or more sensors located on the helical cuff for obtaining data relating to the blood flow characteristics within the vessel and/or vessel characteristics.

10. The device of claim 9, wherein the one or more sensors include one or more of electrodes, pressure sensors and ultrasonic emitters.

11. The device of claim 9, wherein the one or more sensor(s) is are located on a radially internal portion of the helical cuff, positionable in direct abutment with the vessel.

12. The device of claim 9, wherein the one or more sensors are configured to wirelessly communicate with a computer to transmit information concerning the data relating to the blood flow characteristics and/or the vessel characteristics.

13. A device for altering blood flow characteristics in a vessel, the device comprising:

a helical cuff comprising an elastically-deformable spine and a compliant layer over the spine, wherein the helical cuff—
- extends along a longitudinal axis and defines a passageway therethrough along the longitudinal axis,
- is configured to be surgically positioned around a portion of the vessel such that the portion of the vessel is within the passageway, and
- includes an abutment formation extending radially inward toward the longitudinal axis such that the passageway is non-linear along the longitudinal axis to (a) locally reduce a cross-sectional area of the portion of the vessel extending through the cuff and/or (b) change a cross-sectional shape of the portion of the vessel extending through the cuff.

* * * * *